Patented Aug. 9, 1932

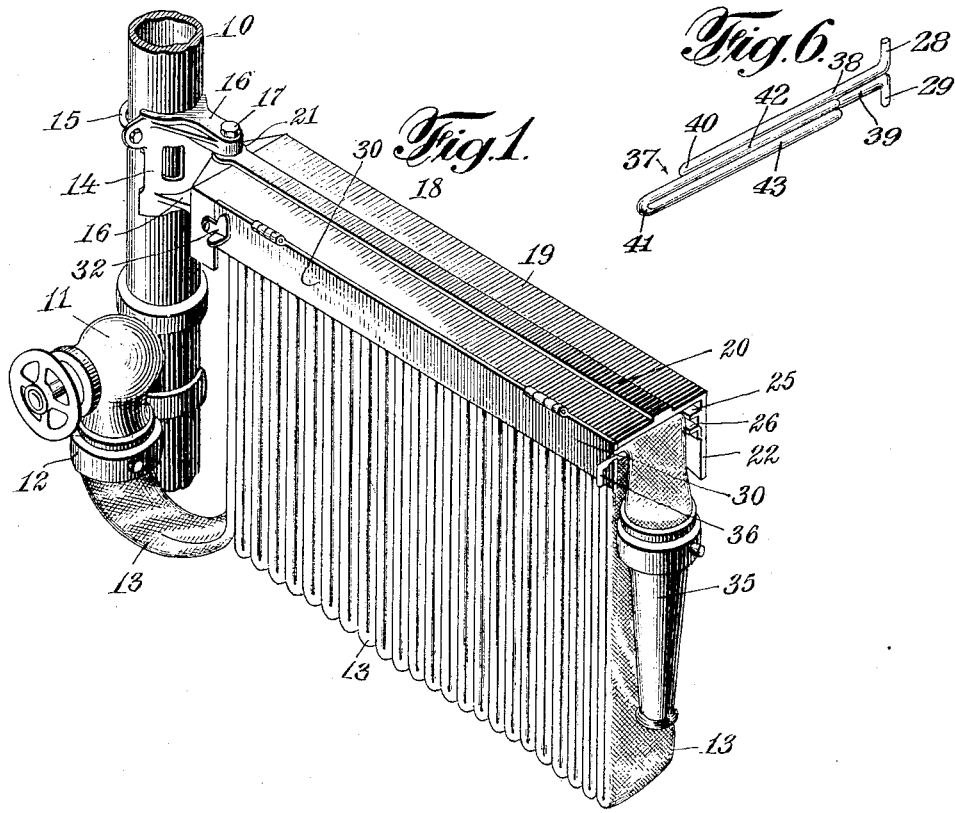
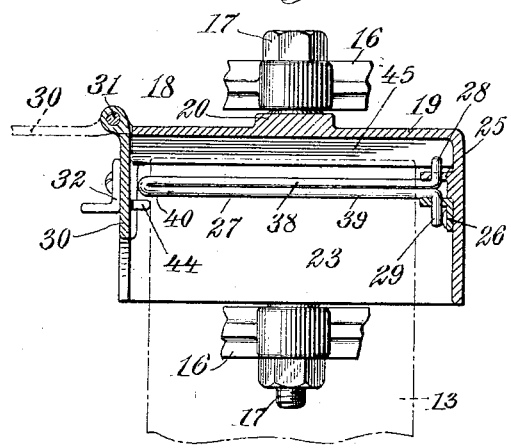
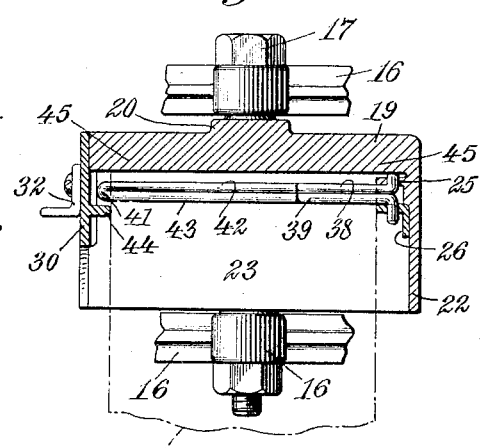

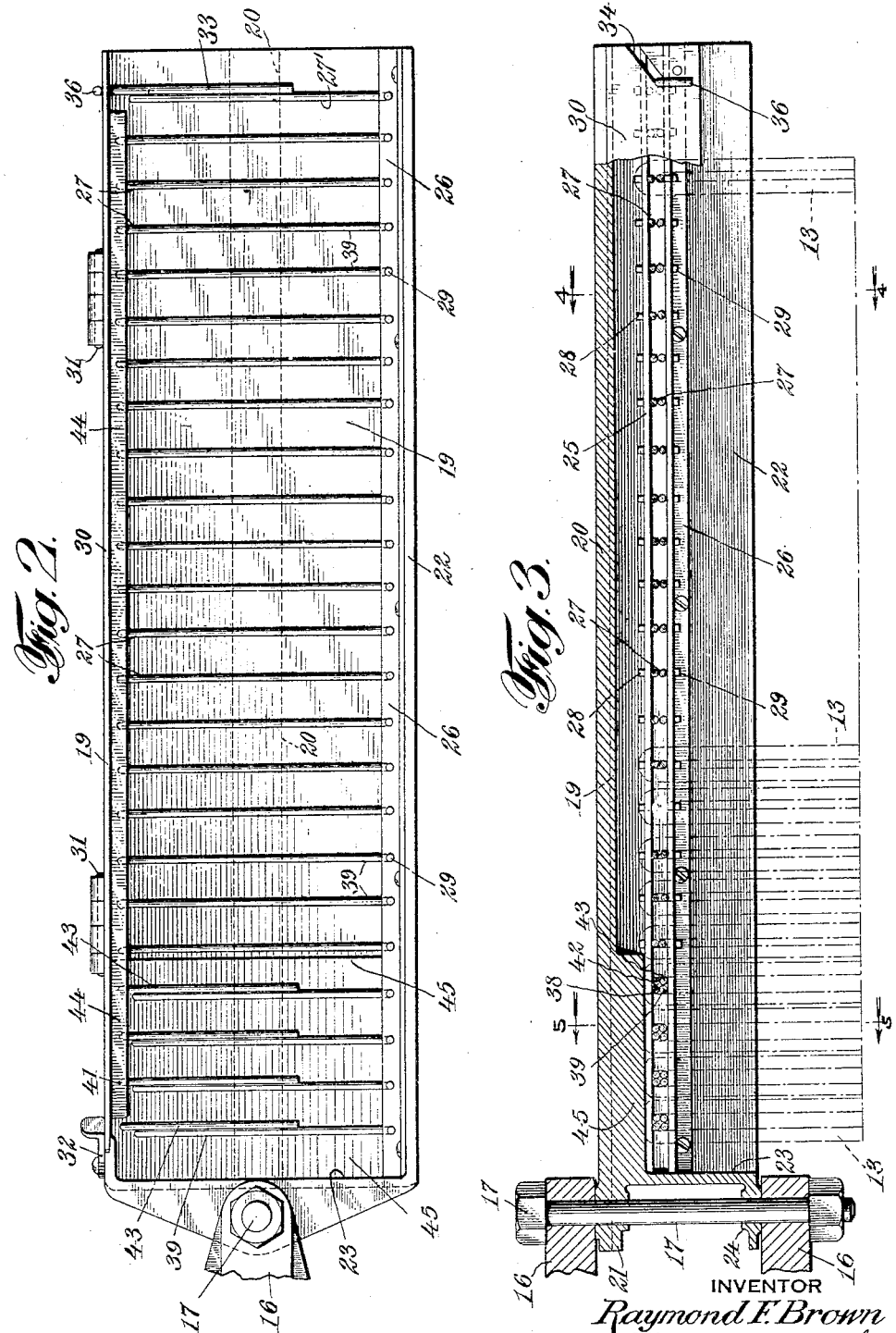

1,870,322

UNITED STATES PATENT OFFICE

RAYMOND F. BROWN, OF NEW YORK, N. Y.

HOSE RACK

Application filed October 7, 1930. Serial No. 486,913.

My invention relates to improvements in hose-racks of the type employed for supporting a length of fire-hose in folded or looped form in convenient position so that it may be readily released or unfolded and laid for immediate use when required.

In the use of hose-racks, or rather in bringing into use a hose from a hose-rack, it is common practice to have the valve connecting the hose with the stand-pipe open during the act of detaching or discharging the hose from the rack. While in some cases no disadvantage is experienced, yet it frequently happens that the water commences to flow in the hose and around its various folds while it has only been partially discharged or detached. This premature entry of the water into the hose while it is folded results in kinking the hose and at times in holding the hose shut at the places where it was folded.

The principal object of my invention is to provide improvements in a device of this character which will permit the hose to be detached from the rack rapidly fold by fold and which will prevent water passing the innermost folds even though the supply valve be entirely open.

It is a further object of my invention to provide a supporting member of the character above indicated which comprises few and simple parts, which is not liable to get out of order, from which the hose may be either instantly and completely detached as a whole without danger of becoming entangled, or from which, if the operator prefers, the hose may be detached fold by fold without danger of water passing the innermost folds, and upon which the hose may be easily, conveniently and completely supported in position for instant use.

A further object of said invention is the provision of a supporting member having a plurality of supporting bars or rods upon which the folds of the looped hose are supported, and in which said bars are so mounted within said member as to permit of the movement of the bars relative to said member in order to facilitate the arranging of the hose thereon or the removal of the same from the rack.

A further object of this invention is the provision of means for compactly holding some at least of the folds of the hose for preventing the passage of water, and also for making some of the supporting bars or rods more rigid or less yielding in their supporting position for accomplishing this purpose.

A further object of the invention is to provide a pressure resisting device located above some of the folds and in the preferred embodiment above the innermost folds for the purpose of preventing a flow of water until the hose has been removed from the supports adjacent the pressure resisting device.

Other objects and advantages will in part be obvious, and in part be pointed out in the specification.

To the attainment of the aforesaid objects and ends, my invention consists in the novel details of construction, and in the combination, connection and arrangement of parts hereinafter more fully described and then pointed out in the claims.

Referring to the drawings wherein I have shown what I now consider to be the preferred form of my invention.

Figure 1 is a perspective showing a hose-rack embodying my invention applied to a stand-pipe and supporting a hose looped upon it.

Fig. 2 is an underside view of the rack shown in Fig. 1, but on a larger scale, the hose not being represented.

Fig. 3 is a longitudinal section of the rack illustrated in Fig. 2, the position of the hose being represented in broken lines.

Fig. 4 is a section taken at about the plane of the line 4—4 in Fig. 3 looking in the direction of the arrows.

Fig. 5 is a section taken at about the plane of the line 5—5 in Fig. 3 looking in the direction of the arrows, and Fig. 6 is a detail perspective view of one of the reinforced supporting rods or bars.

In said drawings, the hose-rack is illustrated as applied to a stand-pipe 10, such as is usually found in buildings and other structures for fire-extinguishing purposes, and which serves as a convenient support for the hose-rack. It will be understood that any other suitable support may be employed. The stand-pipe is provided with a suitable valve 11 which receives the coupling 12 of a length of fire-hose 13.

The hose-rack may be mounted on the stand-pipe or other support by means of a bracket member having a plate 14 suitably formed for engaging the side of the stand-pipe and against which pipe the plate is held by means of a suitable bent bolt 15 preferably engaging with ears at the upper end of the plate, the weight of the structure and the hose being sufficient to hold the lower part of the plate securely in position. The plate 14 carries a pair of arms 16 to which there is pivotally mounted at 17 a supporting bracket 18, such bracket comprising a top plate 19 preferably formed with a longitudinal supporting and strengthening rib or bar 20 which extends into an eye at 21 for receiving the pivot pin 17. The plate continues into a valance or back member 22 which is integrally connected to the inner end member 23, also connected with the top plate 19. The lower eye 24 for the pivot pin 17 also extends from the end of plate 23.

The entire bracket frame is preferably cast and may have formed along the upper portion of the back plate 22 a forwardly directed rib 25 which, in cooperation with an angle bar 26, provides means for pivotally mounting a plurality of supporting rods or bars 27. A convenient manner for making these bars 27 is to bend them of wire having at their ends upwardly and downwardly projecting pintles 28 and 29 which pass through suitably formed, preferably drilled, holes in the webs 25 and 26. By bringing these webs sufficiently close together there is no danger, provided the pintles 28 and 29 are of ample length, of displacement of the supporting rods or bars.

The supporting rods or bars 27 are located a sufficient distance apart for properly supporting the contemplated hose when this is folded and looped over the bars, the hose being so shown in Fig. 1.

For the purpose of protecting the hose where it is looped and for preventing its unintentional or accidental discharge, a front cover plate 30 is provided, it being shown hinged as in 31 to the top plate 19. A suitable catch or lock 32 is pivoted at the inner end of the bracket for engaging the cover and holding it closed until it is desired to open it. In most cases of operation the opening of this cover 30 is to permit the application of the hose to the supporting rods or bars 27. It also may be open when it is desired to discharge the hose as a whole and when folded.

The bar or bracket 27' at the outer end of the rack is shown extended as by means of a part 33, which may be termed an arm, secured to it. Such extension wire is of sufficient length to pass through a downwardly slanting slot 34 in the cover plate 30. The purpose of this is to more rigidly support the outer end of the hose and its nozzle 35 and associated parts. The end 36 of the part 33 is preferably given a downward bend so that it may overlay the front face of the cover 30 and afford a locking means for holding such cover against accidental displacement.

When the hose 13 is being removed from the rack pressure is generally present in the stand-pipe 10 and the valve connecting the stand-pipe to the hose is generally open so that there is a tendency for either water or the body of air which is ahead of it to pass through the hose 13 while this is in its folded condition. Such premature entry of either water or air into the hose interferes with its use, sometimes to such an extent that the operator is obliged to shut off the valve before he is able to straighten the hose and lay it for its work.

My improved device prevents this premature entry of air or water into the hose while it is folded by providing such an arrangement that the major part of the hose is quickly and easily withdrawn from the rack fold by fold and straightens out as it is drawn forward by the firemen. The folds for the last few of the loops are so supported that the folds are closed against the passage of fluid. In the preferred embodiment of my invention illustrated herein this is effected by forming the supporting rods or bars 27 of a more rigid construction than the major portion of the bars. In the illustration the first four bars at the inner end have secured to them stiffening extensions 37. It may be noted that in the form of construction for these bars 27 I have chosen to employ a wire bent upon itself so that there are two lengths of wire, as 38 and 39, (see Fig. 4) the ends forming the pintles 28 and 29 above referred to, the wire being bent sharply upon itself as at 40 and the two lengths 38 and 39 lying closely together.

In the illustration it will also be seen that the looped ends 40 terminate inward of or behind the hinged cover 30. The illustrated manner of forming the stiffening extensions 37 is to provide a piece of wire bent sharply upon itself as at 41 and forming two lengths 42 and 43 lying closely together, the ends of which lengths 42 and 43 are located beyond the center of the bars 27 and the bent or free end 41 approaches quite nearly the rear face of the cover 30. The rear face of such cover is formed with a rearwardly directed ledge or shelf 44 located in position for receiving the free ends 40 and 41 of the rods 27, and extension parts 37, for adding to their rigidity.

It is to be noted, by reference to Fig. 2, that in the normal position the free end of the innermost supporting bar does not initially engage the shelf 44. It will also be seen that the shelf extends outwardly sufficiently far to support all of the extended bars during a certain amount of their swinging movement while the hose is being unfolded from them.

For the purpose of holding the hose shut at the portion where it is looped over the more rigid supporting bars, some suitable pressure resisting device is employed which, in the illustration, is afforded by thickening as at 45 the top portion 19 of the frame above the position normally occupied by the innermost supporting bars. This thickening also serves the additional purpose of strengthening the frame in the region in which it engages, and is carried by the pivot pin 17.

The operation of the device is substantially as follows: Assuming that the hose is connected at the coupling 12 and that the rack has been secured to the stand-pipe, the operator raises the cover 30 and loops the hose over the supporting rods or bars 27. After this is completed he closes the cover 30 making sure that the ledge 44 is in proper position below the projecting or free ends of the bars, and he also inserts the extension 33 of the bar 27' in the slot 34 and sees that the end 36 of this wire and the catch 32 are in locked position. The pressure resisting device, the thickening 45 of the plate 19, compresses the innermost loops of the hose so that when the parts are properly located in position, fluid cannot pass beyond the innermost supporting bar or the first few of these.

When it is desired to use the hose or remove it from the rack and lay it out for use, the operator grasps the nozzle 35 and moves this away from the rack. This outward movement of the hose nozzle causes the various supporting bars to swing outwardly and release the hose fold by fold. Possibly this movement is so rapid that it can hardly be said that the hose is straightened out fold by fold, but yet such is the real function of the supporting bars. The pressure plate 45, together with the supporting ledge 44, delays the release of the last few folds of the hose so that its main portion may be straightened out before the hose is released from the comprehensive action of this pressure exerting member reacting against the stiffened, reinforced and supporting bars, to the end that fluid from the stand-pipe will not find access to the main portion of the hose until it is in such a position that its straightening out will not be interfered with by the presence of such fluid.

Having thus described my said invention what I claim and desire to secure by Letters Patent is:

1. A hose rack including a frame, a series of supporting bars mounted thereon along one rigid wall thereof, a cover pivotally secured upon the portion of the frame opposite said rigid wall, and operatively associated with said bars, means for securing said cover to hold the hose in an inoperative position, a pressure resisting member adapted to cooperate with certain of said bars to engage with the bends of the hose looped on said bars to prevent the passage of water through the portions of said hose engaged by said pressure resisting member until said cover is released and the other bars have been freed of the folded portions of the hose thereon, substantially as specified.

2. A hose rack including a frame, a series of supporting bars mounted thereon along one rigid wall thereof, a cover pivotally secured upon the portion of the frame opposite said rigid wall, means for locking said cover in position to confine the hose looped on said bars, a pressure resisting member adapted to cooperate with certain of said bars and thereby engaging with folded bends of the looped hose to prevent the passage of water through the portions of said hose engaged by said pressure resisting member until said cover has been released and the other bars have been freed of the portions of the hose thereon, substantially as specified.

3. A hose rack including a frame, a series of supporting bars mounted thereon along one rigid longitudinal wall thereof, a longitudinal cover pivotally secured upon the portion of the frame opposite said rigid wall, means for locking said cover in position to confine the hose looped on said bars, a pressure resisting member adapted to cooperate with certain of said bars to engage with the corresponding folded bends of the looped hose whereby to prevent the passage of water through the looped portions of said hose engaged by said pressure resisting member until said means for locking the cover has been released by the withdrawal of the nozzle end of the hose and the other of said bars have been freed of the portions of the hose thereon, substantially as specified.

4. A hose rack including a frame, a series of individually-pivoted supporting bars mounted therein along one rigid wall thereof, a cover pivotally secured upon the portion of the frame opposite to said rigid wall, means on said cover cooperating with one of said pivoted bars for locking said cover in position to confine the hose looped on said bars, a pressure resisting member adapted to cooperate with certain of said bars to engage with the corresponding folded bends of the looped hose whereby to prevent the passage of water through the looped portions of said hose engaged by said pressure resisting member until said cover has been unlocked and the other bars have released the portions of the hose thereon, substantially as specified.

5. A hose rack including a frame, a series of individually-pivoted supporting bars mounted therein along one rigid wall thereof, a cover pivotally secured upon the portion of the frame opposite to said rigid wall, a recess in said cover adapted to releasably hold the free end of the outermost of said bars for locking said cover in position to confine the hose looped on said bars, a pressure resisting member adapted to cooperate with certain of said bars to engage with the corresponding folded bends of the looped hose whereby to prevent the passage of water through the looped portions of said hose engaged by said pressure resisting member until said outermost pin is released of its engagement with the recess in said cover, and the other bars have released the portions of the hose thereon, substantially as specified.

6. In a hose-rack, the combination with a longitudinal frame comprising a top member, a back member, an inner end member, and a front member hinged to the top member, of a series of supporting bars pivotally mounted along the back frame member and adapted to assume positions transversely thereof when in hose supporting position, one or more of the bars adjacent the inner end member being of more sturdy construction and the outermost bar being formed with a hooked extension, the front frame member carrying a ledge for supporting the free ends of the aforesaid more sturdy bars and also having a slot for cooperatively receiving the extension of the outermost bar, and the top frame member, where this overlies the more sturdy bars and the ledge, being formed with a face for compressing the loops of a folded hose against such bars, the hooked end of the outermost bar being adapted to extend beyond the face of the front frame member and hold this closed, substantially as specified.

Signed at the city of New York, in the county and State of New York, this 16th day of September, 1930.

RAYMOND F. BROWN.